(12) United States Patent
Schiel et al.

(10) Patent No.: US 9,353,758 B2
(45) Date of Patent: May 31, 2016

(54) FAN MODULE

(75) Inventors: Andreas Schiel, Gemsbach-Lautenbach (DE); Matthias Ludwig, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 621 days.

(21) Appl. No.: 13/808,928

(22) PCT Filed: Jun. 21, 2011

(86) PCT No.: PCT/EP2011/060289
§ 371 (c)(1),
(2), (4) Date: Jan. 8, 2013

(87) PCT Pub. No.: WO2012/007253
PCT Pub. Date: Jan. 19, 2012

(65) Prior Publication Data
US 2013/0115119 A1 May 9, 2013

(30) Foreign Application Priority Data
Jul. 14, 2010 (DE) .......................... 10 2010 031 303

(51) Int. Cl.
*F04D 29/26* (2006.01)
*F04D 25/06* (2006.01)
(Continued)

(52) U.S. Cl.
CPC .............. *F04D 25/06* (2013.01); *F04D 25/064* (2013.01); *F04D 25/0613* (2013.01); *F04D 25/0646* (2013.01); *F04D 25/082* (2013.01); *F04D 29/263* (2013.01); *F04D 29/326* (2013.01);
(Continued)

(58) Field of Classification Search
CPC ..... H02K 9/06; F04D 25/0613; F04D 25/064; F04D 25/0646; F04D 25/08; F04D 25/082; F04D 29/329

USPC ................. 417/352, 353, 354, 423.8, 423.14, 417/423.15
See application file for complete search history.

(56) References Cited

U.S. PATENT DOCUMENTS 4,783,608 A 11/1988 Gruber et al.
5,217,353 A * 6/1993 De Filippis ........... F04D 25/082
417/354

(Continued)

FOREIGN PATENT DOCUMENTS

| CN | 2069045 | 1/1991 |
|---|---|---|
| DE | 4041739 | 6/1991 |
| TW | 479394 | 3/2002 |

OTHER PUBLICATIONS

International Search Report for Application No. PCT/EP2011/060289 dated Sep. 28, 2011 (English Translation and Original, 4 pages).

*Primary Examiner* — Peter J Bertheaud
(74) *Attorney, Agent, or Firm* — Michael Best & Friedrich LLP (57) ABSTRACT

The invention relates to a fan module, in particular for air conditioners in vehicles, comprising an electric motor and a fan rotor, wherein the electric motor and the fan rotor are arranged on a rotor shaft and are connected to each other by a drive connection, and wherein the electric motor is designed to drive the fan rotor via a drive connection, wherein the drive connection has a positive connection to a driver and a mating driver piece, wherein the driver on the electric motor and the mating driver piece on the fan rotor are arranged spaced apart radially with respect to the rotor shaft, wherein the driver is formed and designed in the direction of rotation of the fan rotor to actuate the mating driver piece in order to transmit a force from the electric motor to the fan rotor.

14 Claims, 5 Drawing Sheets

(51) Int. Cl.
*F04D 25/08* (2006.01)
*F04D 29/32* (2006.01)
*H02K 7/00* (2006.01)
*H02K 7/14* (2006.01)

(52) U.S. Cl.
CPC .............. *F04D 29/329* (2013.01); *H02K 7/003* (2013.01); *H02K 7/14* (2013.01)

(56) References Cited

U.S. PATENT DOCUMENTS

| | | | |
|---|---|---|---|
| 5,814,908 A * | 9/1998 | Muszynski | F04D 25/082 310/58 |
| 5,944,497 A * | 8/1999 | Kershaw | F04D 25/082 417/368 |
| 6,107,708 A * | 8/2000 | Yamaguchi | B60H 1/00457 310/58 |
| 6,224,335 B1 * | 5/2001 | Parisi | F04D 29/162 415/206 |
| 6,236,126 B1 * | 5/2001 | Yagi | H02K 1/2786 310/156.26 |
| 7,045,919 B1 | 5/2006 | Lin | |
| 7,507,068 B2 * | 3/2009 | Lin | F04D 25/082 415/176 |
| 7,699,587 B2 * | 4/2010 | Chapman | F04D 25/082 310/89 |

* cited by examiner

FAN MODULE

BACKGROUND OF THE INVENTION

The invention relates to a fan module, in particular for airconditioning systems in vehicles, having an electric motor and a fan rotor, wherein the electric motor and the fan rotor are arranged on a rotor shaft and are connected to one another by means of a drive connection, and wherein the electric motor is configured to drive the fan rotor via the drive connection.

The passenger compartment in vehicles is ventilated for the purpose of airconditioning, for increasing the comfort and for the sake of travelling safety by means of a ventilation system to which a heating and/or airconditioning system is connected. In order to feed the air into the passenger compartment, a fan module is connected to the ventilation system, said fan module sucking in fresh air from the surroundings of the vehicle and directing it into the heating and/or airconditioning system in order to bring the sucked-in air to the desired temperature. The air which flows through the passenger compartment is usually carried out of the passenger compartment through ventilation slits, for example on the parcel shelf.

The fan module which is connected to the ventilation system is usually constructed as a radial compressor which is driven by an electric motor. The electric motor is integrated here in terms of its design into the fan module and is usually embodied as a brushless electric motor in the form of an external rotor. In order to transmit the torque of the electric motor to a fan rotor of the fan module, the fan module usually has a shaft-hub connection which is embodied as a positively locking or frictionally locking connection. Owing to the large temperature range in which the fan module is used, the shaft-hub connection must be of high quality in order to transmit the torque of the electric motor to the fan rotor reliably and quietly.

SUMMARY OF THE INVENTION

The object of the invention is to make available an improved fan module.

According to the invention, a fan module is proposed, in particular for airconditioning systems in vehicles, having an electric motor and a fan rotor. In this context, the electric motor and the fan rotor are arranged on a rotor shaft and are connected to one another by means of a drive connection. The electric motor drives the fan rotor via the drive connection, wherein the drive connection has a positively locking connection to a driver and a driver counterpart. The driver on the electric motor and the driver counterpart on the fan rotor are arranged spaced radially apart from the rotor shaft. In this context, the driver is configured to activate the driver counterpart of the fan rotor in order to transmit force from the electric motor to the fan rotor.

In this way, a positively locking connection for the drive connection is made available, by means of which the torque can be reliably transmitted at a wide variety of temperatures, wherein in addition improved running of the fan rotor is made available.

In a further embodiment of the invention, the driver has at least two driver elements which are embodied in the form of a pin and are oriented parallel to the rotational axis, wherein the activation elements are arranged in a U shape in the direction of rotation and form the receptacle. In this way, a particularly simple positively locking connection is made available for transmitting a torque of the electric motor to the fan rotor.

In a further embodiment of the invention, the driver counterpart is embodied as a reinforcing rib of the fan rotor, wherein the driver activates the reinforcing rib of the fan rotor in order to drive the fan rotor. As a result of this configuration, the fan rotor can be of particularly simply design.

In a further embodiment of the invention, the receptacle has a press fit with respect to a thickness of the reinforcing rib in an attachment region of the reinforcing rib. In this way, the generation of noise when the torque of the electric motor is transmitted to the housing rotor can be reliably avoided.

In a further embodiment of the invention, the driver is embodied in one piece with, and from the same material as, a housing part of the housing of the electric motor. In this way, the positively locking connection can be manufactured cost-effectively, for example in an injection molding method.

In a further embodiment of the invention, the fan module comprises a rotor shaft which is arranged on the rotational axis of the fan module. The rotor shaft serves to axially secure the fan rotor and is connected thereto by means of a positively locking connection. In this context, the driver is configured predominantly to transmit the torque of the electric motor, while the positively locking connection brings about the axial securement of the fan rotor.

In this way, the positively locking connection can be made smaller and more cost-effective by virtue of a cost-effective selection of material.

BRIEF DESCRIPTION OF THE DRAWINGS

The invention will be explained in more detail below with reference to figures, in which.

DETAILED DESCRIPTION

Figure 1:
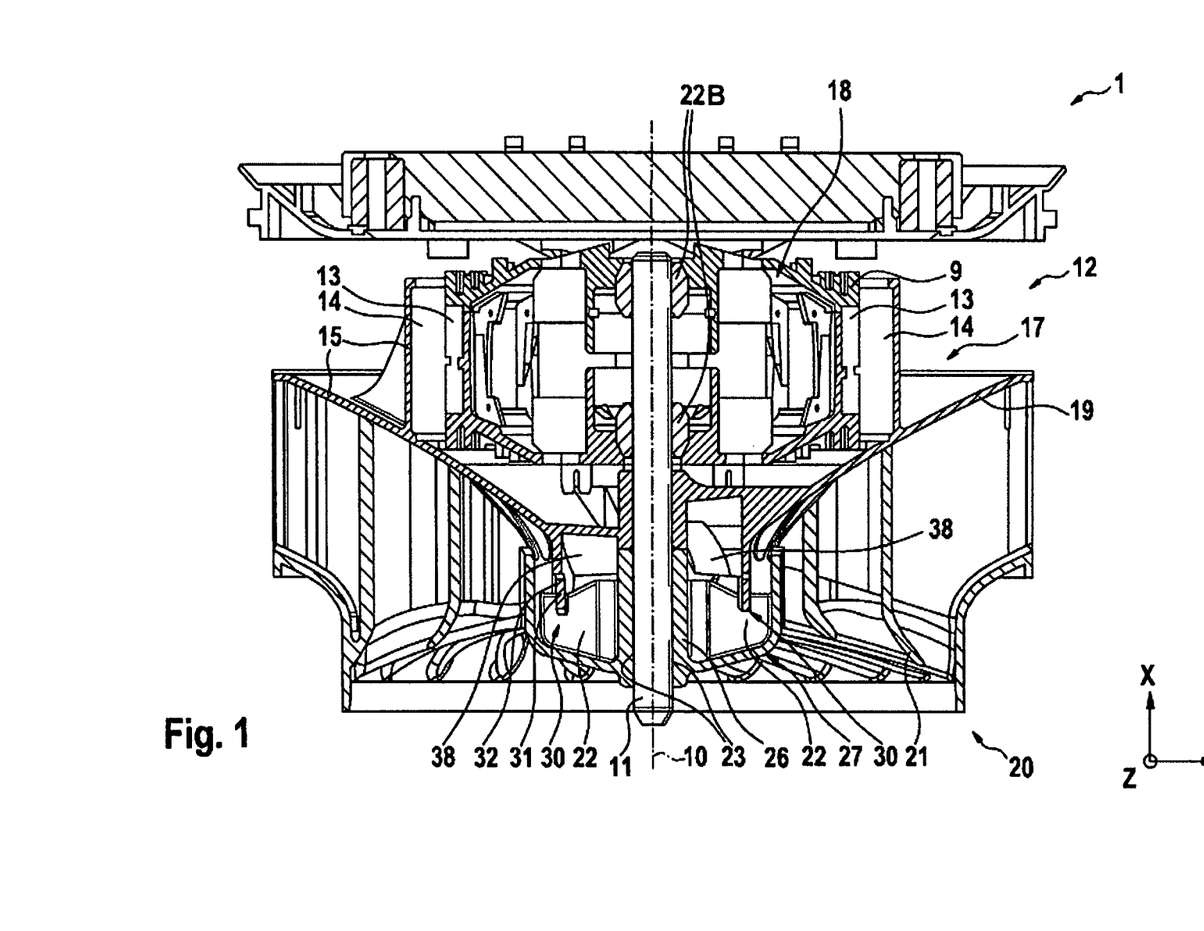
FIG. 1 shows a longitudinal section through a first fan module along a rotational axis.
Figure 2:
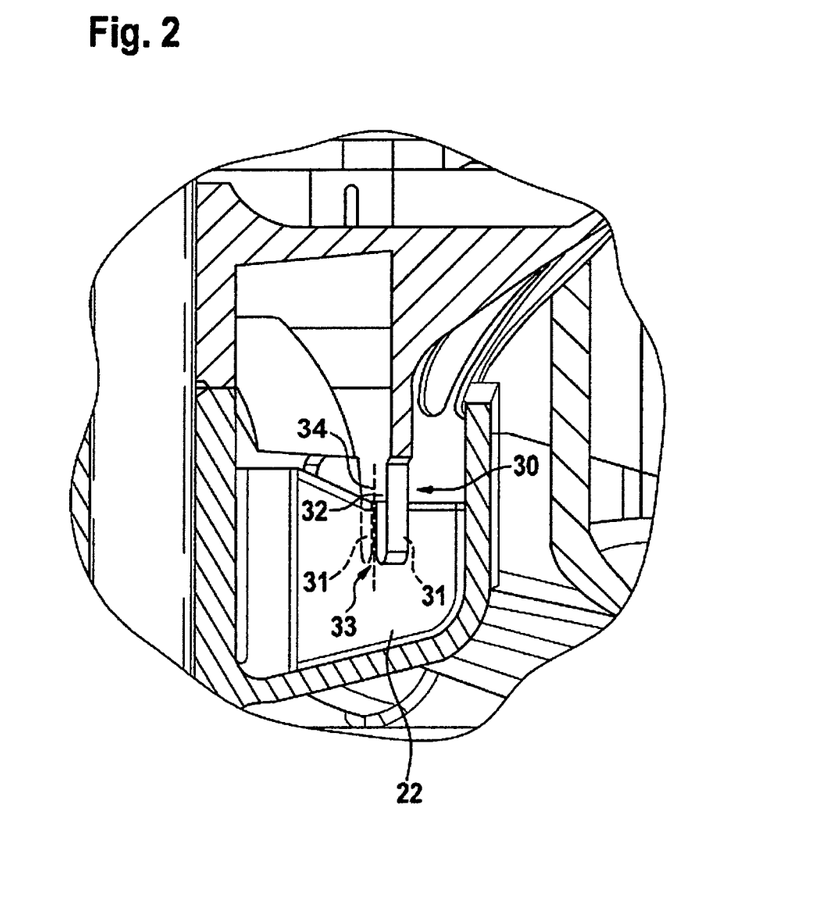
FIG. 2 shows a detail of the longitudinal section, shown in FIG. 1, through the first fan module.

FIG. 1 shows a longitudinal section through a first fan module 1, and FIG. 2 shows a detail of the longitudinal section shown in FIG. 1. FIG. 1 and the following figures also illustrate a coordinate system with directions x, y and z which are perpendicular to one another, with reference to which the method of functioning of the fan module 1, 2 is described.

The first fan module 1 comprises an electric motor 12 which comprises a first rotor 17 and a stator 18. The stator 18 comprises a carrier 9 which is embodied in a rotationally symmetrical fashion with respect to a rotational axis 10 (y direction) of the first rotor 17, wherein a plurality of windings 13 of the stator 18 are arranged radially on the outside around the carrier 9. On the inside, the carrier 9 accommodates two bearings 22B for supporting the first rotor 17.

The first rotor 17 of the electric motor 12 is embodied as an external rotor and comprises a rotor housing 19 which radially partially engages around the stator 18, and magnets 14 which are arranged radially on the rotor housing 19, on the inside in the circumferential direction. In addition, the fan module 1 comprises a rotor shaft 11 on which the rotor 17 of the electric motor 12 is arranged. The rotor shaft 12 is arranged on the rotational axis 10 of the first fan module 1 and is mounted rotatably about the rotational axis 10 by the bearings 22B of the stator 18. On an end side (x-z plane) which faces a first fan rotor 20, explained in more detail below, the first rotor housing 19 of the first rotor 17 has a first driver 30 which is embodied in the direction of the first fan rotor 20 (y direction) and is spaced apart radially from the rotational axis 10. In addition, the rotor housing 19 has a cooling air fan 38 which supplies the electric motor 12 with cooling air during operation.

A first fan rotor 20 is arranged underneath the electric motor 12, on the rotational axis 10. The first fan rotor 20 is embodied as a radial compressor with a plurality of compressor blades 21 lying radially on the outside, and feeds air from an input side, arranged on the underside, of the fan module 1 to an output side, arranged radially on the outside, of the fan module 1 (not illustrated).

The first fan rotor 20 comprises a region 27 which is arranged radially on the inside and is embodied in the form of a trough, a plurality of reinforcing ribs 22 and a bearing region 23 of a bushing 26 for a frictionally locking connection to the rotor shaft 11. The trough-shaped region 27 is embodied so as to be open towards the first rotor 17 of the electric motor 12. The reinforcing ribs 22 of the first fan rotor 20 are arranged at regular angular intervals of 60° in the circumferential direction about the rotational axis 10 in the trough-shaped region 27 of the first fan rotor 20 and connect the bushing 26 and the region arranged radially on the outside to the compressor blades 21. The reinforcing ribs 22 are embodied in the form of plates, in one piece with, and from the same material as, the first fan rotor 20. The arrangement of the reinforcing ribs 20 in the trough-shaped region 27 ensures low-oscillation support of forces from the frictionally locking connection between bushing 26 and rotor shaft 11 and from the compressor blades 21 of the first fan rotor.

The bushing 26 is arranged radially on the inside of the trough-shaped region 27, wherein the bearing region 23 of the bushing 26 faces the rotor shaft 11. The bushing 26 with the bearing face 23 and the rotor shaft 11 are matched to one another in such a way that a frictionally locking connection 11, 23 is present on the bushing 26 and the rotor shaft 11. The frictionally locking connection 11, 23 serves to attach the first fan rotor 20 axially to the electric motor 12 and to bear the first fan rotor 20 by means of the bearings 22B of the electric motor 12. A torque of the electric motor 12 is preferably to be transmitted via a positively locking connection 22, 30, explained in more detail below.

The first driver 30 comprises a driver base 32 and driver elements 31 which are arranged thereon and are embodied in the form of pins. The driver base 32 is arranged on the first rotor housing 19 of the first rotor 17 and is oriented axially in the direction of the first fan rotor 20. In addition, the driver base 32 is embodied in the circumferential direction of the first fan rotor 19. The driver elements 31 are each arranged in pairs in the circumferential direction of the electric motor 12 on the driver base 32 of the rotor housing 19. The driver elements 31 of the first driver 30 are embodied here in the y direction and arranged projecting away from the driver base 32 in a U shape, wherein in each case two driver elements 31 comprise at least partially a reinforcing rib 22 as a driver counterpart in the mounted state of the first fan module 1. In this context, the two driver elements 31 of the first driver 30 form a first receptacle 33 into which the reinforcing rib 22 engages as a corresponding driver counterpart in the mounted state of the first fan module 1. The first receptacle 33 of the first driver 30 has a first longitudinal axis 34 which is oriented parallel to the rotational axis 10 of the first fan module 1. The first receptacle 33 is adapted to a thickness of the reinforcing rib 22 in such a way that it forms a press fit with respect to the thickness of the reinforcing rib 22, in the bearing region of the first receptacle 33. The press fit of the receptacle 23 and on the reinforcing rib 22 in this context has the advantage that the generation of noise by the fan module 1 is reduced.

If the electric motor 12 of the first fan module 1 is energized, the electric motor 12 makes available a torque for driving the first fan rotor 20 at the first rotor 17. The torque of the electric motor 12 is transmitted from the first rotor 17 of the electric motor 12 to the first fan rotor 20 by the engagement of the driver 30 in the reinforcing ribs 22 of the first fan rotor 20. In this context, through the formation of the first driver 30 and of the reinforcing rib 22 a positively locking connection is made available between the electric motor 12 and the first fan rotor 20, which connection is easy to mount and can reliably transmit a high torque of the electric motor 12 to the first fan rotor 20. As a result of the engagement of the driver 30 in the reinforcing ribs 22, the positively locking connection 22, 30 has a temperature-stable behavior, with the result that even in the case of critical high temperatures, such as often occur in the region of the engine compartment of a motor vehicle, the torque of the electric motor 12 can be reliably transmitted.

In the embodiment, the frictionally locking connection 11, 23 is configured, as mentioned above, to attach the first fan rotor 20 to the first rotor 17 of the electric motor 12. Owing to the transmission of torque via the positively locking connection 22, 30 by means of the driver 30 and the reinforcing ribs 22, the positively locking connection 11, 23 to the axial forces which are lower than the forces arising from the transmission of torque are configured to attach the first fan rotor 20 to the electric motor 12. In addition, the frictionally locking connection 11, 23 between first fan rotor 20 and the electric motor 12 can be formed in a temperature-stable fashion as a result of the low loading.

As a result of the first driver 30 being embodied in one piece with, and from the same material as, the first rotor housing 19 of the electric motor 12, the first driver 30 can easily be manufactured in an injection molding method together with the first rotor housing 19.

Figure 3:
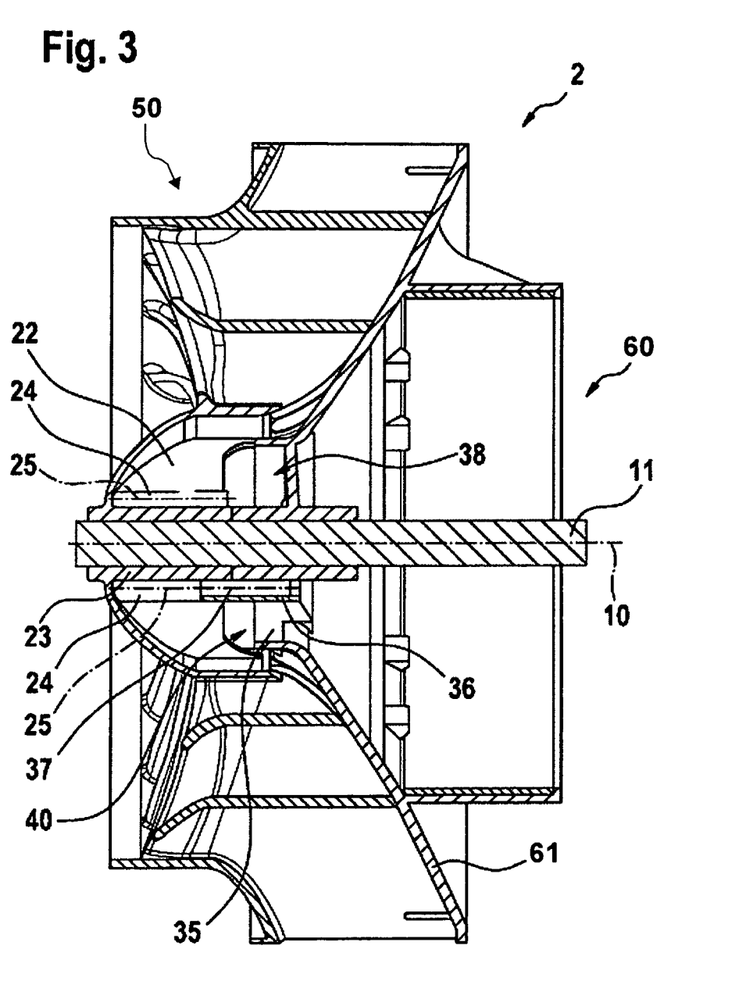
FIG. 3 shows a longitudinal section through a second fan module along the rotational axis.
Figure 4:
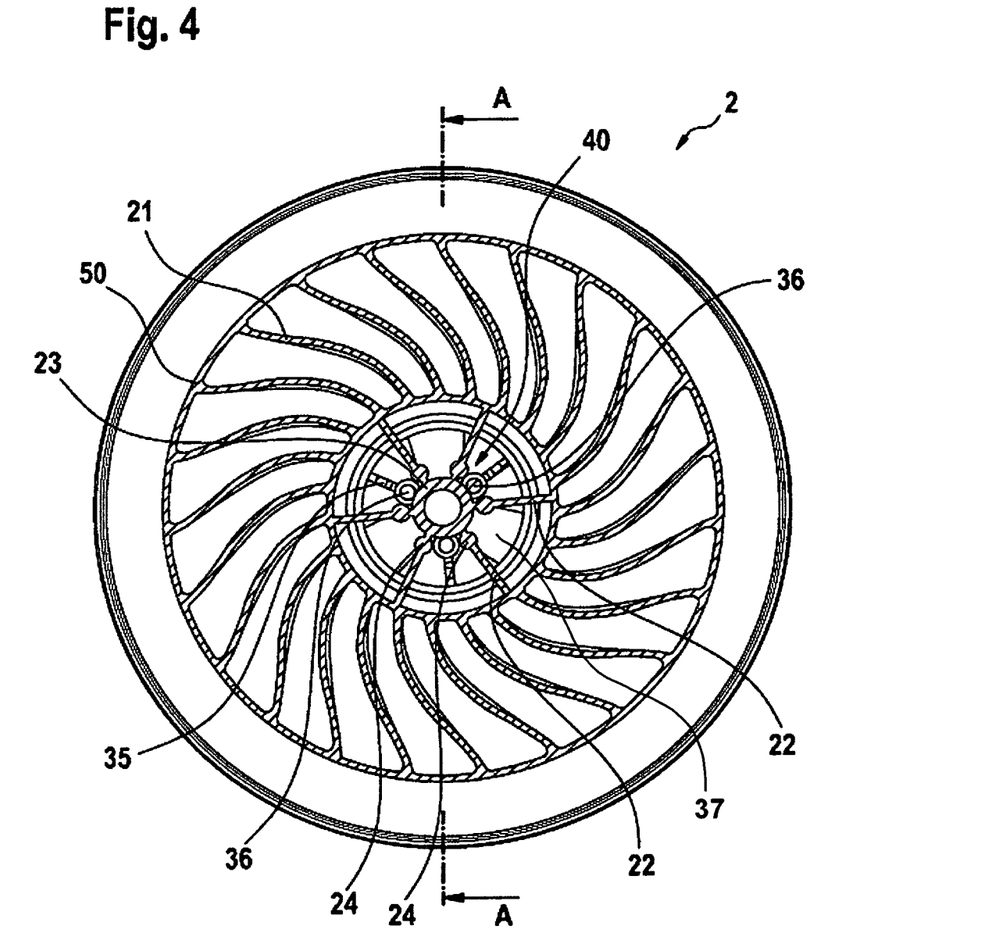
FIG. 4 shows a section transversely with respect to the rotational axis through the second fan module.
Figure 5:
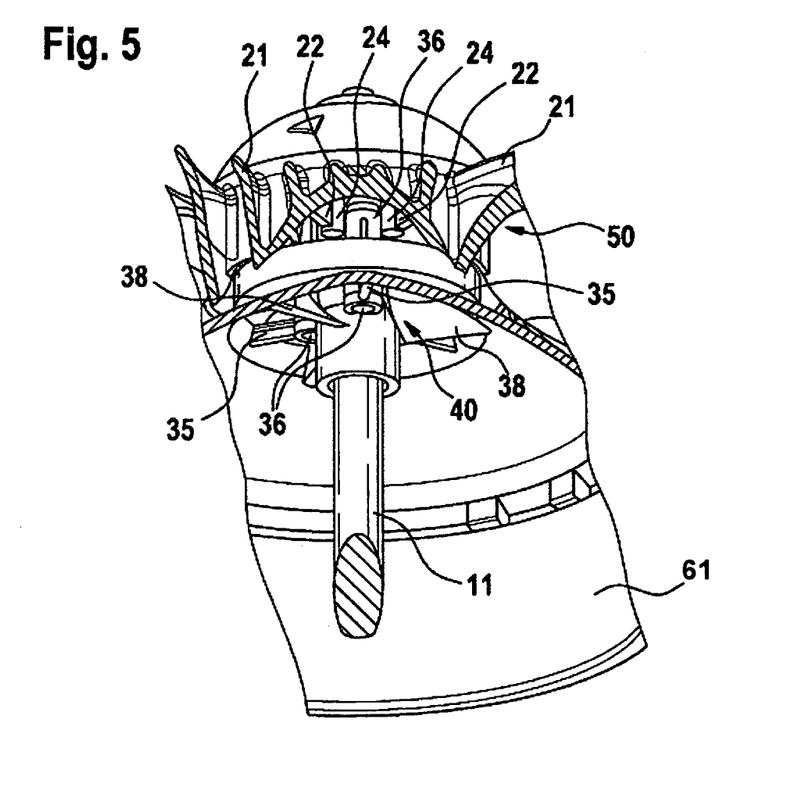
FIG. 5 shows a perspective partial section through the second fan module.

FIG. 3 shows a section along the rotational axis 10 through a second fan module 2. FIG. 4 shows a section transversely with respect to the rotational axis 10 of the second fan module 2, and FIG. 5 shows a perspective section through the second fan module 2 along the rotational axis 10.

The second fan module 2 is embodied here essentially in the same way as the first fan module 1 which is shown in FIGS. 1 and 2, and said second fan module 2 comprises a second fan rotor 50 and the second rotor 60 of the electric motor 12 with a second rotor housing 61. The second rotor housing 61 comprises, on the end side facing the second fan rotor 50, a second driver 40 which projects into the trough-shaped region 37 of the second fan rotor 50. In the embodiment shown in FIGS. 3 to 5, the second fan rotor 50 is also attached to the electric motor 12 by means of the frictionally locking connection 11, 23 between the bushing 26 of the second fan rotor 50 and the rotor shaft 11.

The second driver 40 comprises a plurality of pins 36 which, for example, are embodied in a hollow-cylindrical fashion in the embodiment. In each case a pin 36 of the second driver 40 has second longitudinal axis 37 which is arranged parallel to the rotational axis 10. In this context, the pins 36 are connected by the rear side to, in each case, one housing rib 35 of the second rotor 50. The pins 36 of the second driver 40 are arranged approximately at a 120° angular distance from one another about the rotational axis 10 of the second fan module 2 at an identical radial first distance from the rotational axis 10 of the second fan module 2, around said rotational axis 10.

The second fan rotor 50 comprises, as does also the first fan rotor 20 shown in FIGS. 1 and 2, a plurality of reinforcing ribs 22 which connect an outer radial housing part to the bushing 26 in the trough-shaped region 27. The reinforcing ribs 22 are arranged at an approximately 60° angular distance from one another about the rotational axis. On the reinforcing ribs 22, the second fan rotor 50 has, in each case, a thickened portion 24, embodied in a cylindrical fashion, as a corresponding driver counterpart to the second driver 40. The thickened portion 24 comprises a third longitudinal axis 25, which, like the first longitudinal axis 37 of the first driver 30, is arranged parallel to the rotational axis 10 (y direction). In addition, the third longitudinal axis 25 of the thickened portion 24 is arranged in each case in the plane of the corresponding reinforcing rib 22. The third longitudinal axes 37 of the thickened portions 24 are arranged in a circular shape at a second distance from the rotational axis 10, around the latter. In the embodiment, the first distance from the longitudinal axis of the pins 36 is selected to be smaller than the second distance from the third longitudinal axes 37 of the thickened portions 24. As a result, the position of the second fan rotor 50 in the assembly can be reliably defined. However, in order to define the position, it is also alternatively conceivable to select the first distance of the pins 36 from the rotational axis 10 to be larger than the second distance of the thickened portions 24 from the rotational axis 10.

In the mounted state of the second fan module 2, in each case a pin 36 of the second driver 40 projects in between two reinforcing ribs 22, wherein each pin 36 has a point of contact with, in each case, one thickened portion 24 of a reinforcing rib 22. In this context, in each case two adjacent pins 36 form a second receptacle 28 in which the reinforcing rib 22 with the thickened portion 24 is arranged in the mounted state. In this context, a positively locking connection 22, 24, 40 is made available which is configured to transmit the torque of the electric motor 12 to the second fan rotor 50. If a torque bears against the second rotor 60, in each case a pin 36 presses in the direction of the torque of the electric motor 12 at the point of contact against the thickened portion 24, bearing against the pin 36, of the reinforcing rib 22 and transmits the torque of the electric motor 12 to the second fan rotor 50.

The hollow cylindrical formation of the pins 36 also has the advantage that in each case a pin 36 adapts, by virtue of elastic deformation, to the distance between two thickened portions 24 which are arranged one next to the other. In this context, the pin 36 or the thickened portions 24 of the second fan rotor 50 are matched to one another in such a way that a press fit is present between the pin 36 and the two assigned thickened portions 24, and that the pin 36 is stressed or pressed in between the two thickened portions. This permits the second fan rotor 50 to be attached axially to the second rotor 60 of the electric motor 12 and/or permits a securing force which is additional to the frictionally locking connection 26, 11 to be built up. This advantage also ensures low-noise running of the fan module 50.

Mounting of the second fan module 2 can be carried out more easily by virtue of the fact that the pins 36 of the second driver 40 are arranged at a regular distance, at a 60° angle in the embodiment, about the rotational axis 10 of the second fan module 2. This ensures that for the second fan rotor 50 six possible mounting positions can be made available on the second rotor 60 of the electric motor 12, with the result that a mounting position can be quickly found.

The embodiments of fan modules 1, 2, and the components thereof, explained with reference to the figures constitute preferred or exemplary embodiments of the invention. In addition to the embodiments which are described and illustrated, further embodiments are conceivable which can comprise further refinements or combinations of the described features.

In particular, it is to be noted that the shape and the number or the arrangement of the drivers 30, 40 and of the corresponding driver counterpart 22; 24, that is to say of the reinforcing ribs 22 or of the thickened portions 24 on the reinforcing ribs 22 can vary. It is therefore, for example, also conceivable for the positively locking connection to be configured with just one driver element 32; 36 and one or two corresponding driver counterparts or reinforcing ribs 22. Alternatively it is also conceivable to form the thickened portion 24 on the reinforcing rib 22 of the second fan rotor with a different cross section than the circular cross section shown. It is, for example, conceivable to form the thickened portion 24 of the reinforcing rib 22 with an elliptical, a rectangular or a polygonal cross section. It is also to be noted that the driver counterparts 22, 24 which are shown in the embodiment are exemplary and can, of course, also be constructed in other ways. It is, for example, also conceivable for the cooling air fan 38 which is arranged in the rotor housing to be integrated with cooling air feed laminations in the fan rotor 20; 50, wherein the driver 30; 40 engages in the feed laminations of the cooling air fan 38 as a corresponding driver counterpart.

It is also conceivable for the fan rotor 20, 50 to be attached axially to the reinforcing ribs 22 or to the positively locking connection 22, 24, 30, 40 by means of the press fits of the drivers 30, 40.

The invention claimed is:

1. A fan module (1; 2) having an electric motor (12) and a fan rotor (20; 50), wherein the electric motor (12) and the fan rotor (20; 50) are arranged on a rotor shaft (11) and are connected to one another by a drive connection (22, 30; 24; 40), and wherein the electric motor (12) is configured to drive the fan rotor (20; 50) via the drive connection (22, 30; 24; 40), characterized in that the drive connection (22, 30; 24; 40) has a positively locking connection (22, 30; 24; 40) to a driver (30; 40) and a driver counterpart (22, 24), wherein the driver (30; 40) is arranged on the electric motor (12) and projects in a direction parallel to a rotational axis (10) into a trough-shaped region containing at least two reinforcing ribs (22) and the driver counterpart (22, 24) includes at least one of the two reinforcing ribs (22) and is arranged on the fan rotor (20; 50), spaced radially apart from the rotor shaft (11), wherein the driver (30; 40) of the electric motor (12) is configured to project between the two reinforcing ribs (22) and is further configured to activate the driver counterpart (22, 24) in order to transmit force from the electric motor (12) to the fan rotor (20; 50).

2. The fan module (1; 2) as claimed in claim 1, characterized in that the driver (30; 40) comprises at least one driver element (31; 36) which is embodied in the form of a pin.

3. The fan module (1; 2) as claimed in claim 1, characterized in that the driver counterpart includes a thickened portion (24) on the reinforcing rib (22).

4. The fan module (1; 2) as claimed in claim 3, characterized in that the thickened portion (24) is embodied in a cylindrical fashion, wherein a longitudinal axis (25) of the cylindrical thickened portion (24) is arranged in a plane of the reinforcing rib (22).

5. The fan module (1; 2) as claimed in claim 3, characterized in that a thickness of the thickened portion (24) of the reinforcing rib (22) with respect to a thickness of the driver (40), which is embodied in the form of a projection, is selected in such a way that a force can be transmitted circumferentially to a direction of the rotational axis (10) via adjoining points of contact between the thickened portion (22) and the driver (40).

6. The fan module (1; 2) as claimed in claim 1, characterized in that the driver (30) has at least two driver elements (31), wherein the driver elements (31) are embodied in a U shape in a direction of rotation, and form a receptacle (33), the receptacle (33) has a press fit with respect to a thickness of the reinforcing rib (22) in an attachment region of the reinforcing rib (22).

7. The fan module (1; 2) as claimed in claim 1, characterized in that the driver (30; 40) is embodied in one piece with, and from the same material as, a rotor housing (19; 61) of the electric motor (12).

8. The fan module (1; 2) as claimed in claim 1, characterized in that the electric motor shaft (11) is connected by means of a frictionally locking connection (11, 23) to the fan rotor (20; 50) for the purpose of axial securement, wherein the driver (30; 40) and the corresponding driver counterpart (22; 24) are configured to transmit the torque of the electric motor (12) to the fan rotor (20; 50).

9. The fan module (1;2) as claimed in claim 1, characterized in that the fan module is for airconditioning systems in vehicles.

10. The fan module (1; 2) as claimed in claim 4, characterized in that a thickness of the thickened portion (24) of the reinforcing rib (22) with respect to a thickness of the driver (40), which is embodied in the form of a projection, is selected in such a way that a force can be transmitted circumferentially to a direction of the rotational axis (10) via adjoining points of contact between the thickened portion (22) and the driver (40).

11. The fan module (1; 2) as claimed in claim 3, characterized in that the driver (30) has at least two driver elements (31), wherein the driver elements (31) are embodied in a U shape in a direction of rotation, and form a receptacle (33), the receptacle (33) has a press fit with respect to a thickness of the reinforcing rib (22) in an attachment region of the reinforcing rib (22).

12. The fan module (1; 2) as claimed in claim 4, characterized in that the driver (30) has at least two driver elements (31), wherein the driver elements (31) are embodied in a U shape in a direction of rotation, and form a receptacle (33), the receptacle (33) has a press fit with respect to a thickness of the reinforcing rib (22) in an attachment region of the reinforcing rib (22).

13. The fan module (1; 2) as claimed in claim 5, characterized in that the driver (30) has at least two driver elements (31), wherein the driver elements (31) are embodied in a U shape in a direction of rotation, and form a receptacle (33), the receptacle (33) has a press fit with respect to a thickness of the reinforcing rib (22) in an attachment region of the reinforcing rib (22).

14. The fan module (1; 2) as claimed in claim 3, wherein the driver (30; 40) activates the thickened portion on the reinforcing rib (22) of the fan rotor (20; 50) in order to drive the fan rotor (20; 50).

* * * * *